(12) United States Patent
Do et al.

(10) Patent No.: US 11,978,899 B2
(45) Date of Patent: May 7, 2024

(54) CATHODE FOR LITHIUM SECONDARY BATTERY, LITHIUM SECONDARY BATTERY INCLUDING THE SAME AND METHOD OF FABRICATING LITHIUM SECONDARY BATTERY

(71) Applicants: SK ON CO., LTD., Seoul (KR); SK INNOVATION CO., LTD., Seoul (KR)

(72) Inventors: Young Hoon Do, Daejeon (KR); Byoung Beom Lim, Daejeon (KR); Jeong Hoon Jeun, Daejeon (KR); Yong Hyun Cho, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 18/299,643

(22) Filed: Apr. 12, 2023

(65) Prior Publication Data

US 2023/0327099 A1 Oct. 12, 2023

(30) Foreign Application Priority Data

Apr. 12, 2022 (KR) .................. 10-2022-0045245

(51) Int. Cl.
*H01M 4/505* (2010.01)
*H01M 4/131* (2010.01)
(Continued)

(52) U.S. Cl.
CPC .......... *H01M 4/505* (2013.01); *H01M 4/131* (2013.01); *H01M 4/525* (2013.01);
(Continued)

(58) Field of Classification Search
CPC ...... H01M 4/505; H01M 4/131; H01M 4/525; H01M 10/058; H01M 10/446; H01M 2004/021; H01M 2004/028
See application file for complete search history.

(56) References Cited

U.S. PATENT DOCUMENTS

2012/0258369 A1  10/2012  Yokoyama et al.
2021/0336248 A1  10/2021  Morisaki et al.
(Continued)

FOREIGN PATENT DOCUMENTS

KR        10-1369322 B1      2/2014
KR     10-2018-0043077 A     4/2018
(Continued)

OTHER PUBLICATIONS

Extended European Search Report for European Patent Application No. 23164849.4, dated Sep. 27, 2023 (12 pages).

*Primary Examiner* — Cynthia K Walls
(74) *Attorney, Agent, or Firm* — Perkins Coie LLP

(57) ABSTRACT

A cathode for a lithium secondary battery according to an embodiment of the present invention includes a cathode current collector, and a cathode active material layer on the cathode current collector. The cathode active material layer includes cathode active material particles. The cathode active material particles include first lithium metal oxide particles having a shape of a secondary particle in which a plurality of primary particles are aggregated, and second lithium metal oxide particles having a shape of a single particle. A closed pore ratio of the cathode active material layer is 5% or less.

11 Claims, 2 Drawing Sheets

(51) Int. Cl.
  *H01M 4/525* (2010.01)
  *H01M 10/058* (2010.01)
  *H01M 10/44* (2006.01)
  *H01M 4/02* (2006.01)

(52) U.S. Cl.
  CPC ....... *H01M 10/058* (2013.01); *H01M 10/446* (2013.01); *H01M 2004/021* (2013.01); *H01M 2004/028* (2013.01)

(56) References Cited

U.S. PATENT DOCUMENTS

| | | | |
|---|---|---|---|
| 2021/0367236 A1* | 11/2021 | Liu | H01M 4/525 |
| 2022/0367885 A1* | 11/2022 | Gallant | H01M 6/168 |

FOREIGN PATENT DOCUMENTS

| | | |
|---|---|---|
| KR | 10-1905362 B | 10/2018 |
| KR | 10-2021-0079178 A | 6/2021 |
| WO | 2013/031226 A1 | 3/2013 |
| WO | 2018/150843 A1 | 8/2018 |

\* cited by examiner

CATHODE FOR LITHIUM SECONDARY BATTERY, LITHIUM SECONDARY BATTERY INCLUDING THE SAME AND METHOD OF FABRICATING LITHIUM SECONDARY BATTERY

CROSS-REFERENCE TO RELATED APPLICATION

This application claims priority to Korean Patent Application No. 10-2022-0045245 filed on Apr. 12, 2022 in the Korean Intellectual Property Office (KIPO), the entire disclosure of which is incorporated by reference herein.

TECHNICAL FIELD

This patent document relates to batteries and secondary batteries, including designs of a cathode for a lithium secondary battery, and a method of fabricating a lithium secondary battery.

BACKGROUND

A secondary battery which can be charged and discharged repeatedly has been widely employed as a power source of a mobile electronic device such as a camcorder, a mobile phone, a laptop computer, etc.

A lithium secondary battery is actively developed and applied due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly.

The cathode may include a cathode current collector and a cathode active material layer formed on the cathode current collector. The cathode active material layer may include a lithium metal oxide particle as a cathode active material.

SUMMARY

The technology disclosed in this patent document relates to designs and fabrication of secondary batteries involving a cathode for a lithium secondary battery that includes a cathode active material layer with lithium metal oxide particles. According to an aspect of the disclosed technology, a cathode for a lithium secondary battery may be implemented in ways to improve electrode capacity.

An aspect of the disclosed technology is to provide implementations of a lithium secondary battery having improved capacity and energy density.

Another aspect of the disclosed technology, is to provide implementations of a method of fabricating a lithium secondary battery having improved capacity and energy density.

In various implementations, a cathode for a lithium secondary battery includes a cathode current collector, and a cathode active material layer on the cathode current collector, the cathode active material layer including cathode active material particles. The cathode active material particles include first lithium metal oxide particles having a shape of a secondary particle in which a plurality of primary particles are aggregated, and second lithium metal oxide particles having a shape of a single particle. A closed pore ratio of the cathode active material layer defined by Equation 1 is 5% or less.

$$\text{Closed pore ratio (\%)} = \{V1/(V1+V2)\} \times 100 \quad \text{[Equation 1]}$$

In Equation 1, V1 is a total volume of closed pores within an inside of the cathode active material layer and pores at an inside of the cathode active material particles are excluded from the closed pores, and V2 is a total volume of open pores of the cathode active material layer.

In some embodiments, the closed pore ratio may be 3.7% or less.

In some embodiments, a specific surface area of the cathode active material layer may be in a range from 1 $m^2/g$ to 1.5 $m^2/g$.

In some embodiments, the cathode active material layer may have a density of 3.6 g/cc or more.

In some embodiments, a particle diameter ($D_{50}$) of the first lithium metal oxide particles may be in a range from 10 μm to 20 μm.

In some embodiments, a particle diameter ($D_{50}$) of the second lithium metal oxide particle may be in a range from 3 μm to 10 μm.

In some embodiments, a ratio of a particle diameter ($D_{50}$) of the second lithium metal oxide particles relative to a particle diameter ($D_{50}$) of the first lithium metal oxide particles may be in a range from 0.2 to 0.5.

In some embodiments, a weight ratio of the second lithium metal oxide particles relative to the first lithium metal oxide particles in the cathode active material layer may be in a range from 1/9 to 45/55.

In some embodiments, each of the first lithium metal oxide particles and the second lithium metal oxide particles may contain nickel.

In some embodiments, each of the first lithium metal oxide particles and the second lithium metal particles may contain 80 mol % or more of nickel based on a total number of moles of all elements excluding lithium and oxygen.

A lithium secondary battery includes a cathode for a lithium secondary battery according to the above-described embodiments, and an anode facing the cathode.

In method of fabricating a lithium secondary battery, a preliminary lithium secondary battery that includes an anode and a cathode including a cathode active material layer is prepared.

The cathode active material layer includes cathode active material particles that includes first lithium metal oxide particles having a shape of a secondary particle in which a plurality of primary particles are aggregated and second lithium metal oxide particles having a shape of a single particle. The preliminary lithium secondary battery is charged and discharged at a current density of 0.1 C-rate or less.

In some embodiments, the charging and discharging of the preliminary lithium secondary battery at a current density of 0.1 C-rate or less may include adjusting a closed pore ratio defined by Equation 1 to 5% or less.

$$\text{Closed pore ratio (\%)} = \{V1/(V1+V2)\} \times 100 \quad \text{[Equation 1]}$$

In Equation 1, V1 is a total volume of closed pores within an inside of the cathode active material layer and pores at an inside of the cathode active material particles are excluded from V1, and V2 is a total volume of open pores of the cathode active material layer.

In some embodiments, the charging and discharging of the preliminary lithium secondary battery at a current density of 0.1 C-rate or less may be performed at least three unit cycles of the charging and discharging at a current density of 0.1 C-rate or less.

In some embodiments, the charging and discharging of the preliminary lithium secondary battery at a current density of 0.1 C-rate or less may be performed in a formation process.

A cathode for a lithium secondary battery according to exemplary embodiments of the technology disclosed in this patent document may have a low resistance and an improved electrode capacity.

A lithium secondary battery according to exemplary embodiments of the technology disclosed in this patent document may have an improved capacity and a high energy density.

DETAILED DESCRIPTION

In secondary batteries such as lithium-ion secondary batteries, the energy density of a lithium secondary battery may be improved by increasing an electrode density of the cathode (i.e., a density of the cathode active material layer) high. However, as a pressing strength becomes greater to increase the electrode density of the cathode in various implementations, crakes may be generated in the lithium metal oxide particle having a shape of a secondary particle. Accordingly, during an operation of the lithium secondary battery, a gas generation may occur due to a side reaction between the lithium metal oxide particle and the electrolyte and this may lead to a reduction of life-span properties of the lithium secondary battery.

According to embodiments of the technology disclosed in this patent document, a cathode for a lithium secondary battery having a predetermined range of a closed pore ratio can be provided.

According to embodiments of the technology disclosed in this patent document, a lithium secondary battery including the cathode and a method of fabricating the lithium secondary battery can also be provided.

Hereinafter, examples of embodiments and associated implementations of the technology disclosed in this patent document are described in detail with reference to accompanying drawings.

Cathode for Lithium Secondary Battery

Figure 1:
FIG. 1 is a schematic cross-sectional view illustrating a cathode for a lithium secondary battery in accordance with exemplary embodiments.

FIG. 1 is a schematic cross-sectional view illustrating a cathode for a lithium secondary battery in accordance with exemplary embodiments.

Referring to FIG. 1, a cathode 100 for a lithium secondary battery may include a cathode current collector 105 and a cathode active material layer 110 formed on the cathode current collector 105. The cathode active material layer 110 may be formed on one surface or both surfaces of the cathode current collector 105.

In an embodiment, the cathode current collector 105 may include stainless steel, nickel, aluminum, titanium, copper, or an alloy thereof.

The cathode active material layer 110 may include cathode active material particles (e.g., a lithium metal oxide particle) capable of reversibly intercalating and de-intercalating lithium ions.

In some embodiments, the cathode active material layer 110 may further include a cathode binder and a conductive material.

According to embodiments of the present invention, the cathode active material particles may include first lithium metal oxide particles having a shape of a secondary particle, and second lithium metal oxide particles having a shape of a single particle.

The secondary particle and the single particle may be distinguished by a particle morphology. For example, the secondary particle and the single particle may be distinguished based on a cross-sectional image of the particle measured by a scanning electron microscope (SEM).

The secondary particle may refer to a particle that is substantially considered or observed as one particle by aggregation of a plurality of primary particles. For example, a boundary between the primary particles can be observed in the SEM cross-sectional image of the secondary particle.

In one embodiment, the secondary particles may be an aggregate of more than 10, 30 more, 50 or more, or 100 or more primary particles.

The single particle may refer to a particle that is not an aggregate (e.g., a monolith). For example, boundaries of primary particles may not be observed in the SEM cross-sectional image of the single particle.

However, a particle shape where fine particles (e.g., particles having a volume of 1/100 or less of a volume of the single particle) are attached to a surface of the single particle may not be excluded from the definition of the single particle.

The single particles may be present in contact with each other. For example, 2 to 10, 2 to 5, or 2 to 3 single particles may be present in contact with each other.

The particles are not distinguished by a crystallography. Thus, the primary particle and the single particle may be a single crystal or a polycrystal in a crystallographic aspect.

In exemplary embodiments, the cathode active material layer 110 may have a closed pore ratio (%) defined by Equation 1 of 5% or less.

$$\text{Closed pore ratio (\%)} = \{V1/(V1+V2)\} \times 100 \quad \text{[Equation 1]}$$

In Equation 1, V1 is a total volume of closed pores in the cathode active material layer 110 (excluding a volume of pores within an inside of the cathode active material particles), and V2 is a total volume of open pores in the cathode active material layer 110.

When forming the cathode active material layer 110, solid materials (the cathode active material particles, the binder, the conductive material, etc.) may be packed by being pressed to form the closed pores and the open pores between the solid materials. The closed pores may refer to pores that are not connected to an outside of the cathode active material layer 110. The open pores may refer to pores connected to the outside of the cathode active material layer 110.

When a cathode active material layer only including lithium metal oxide particles in the shape of the secondary particle as a cathode active material is pressed, the lithium metal oxide particles in the shape of the secondary particle may be easily cracked. In this case, during an operation of the lithium secondary battery, a side reaction with the electrolyte may be increased, and life-span properties of the lithium secondary battery may be deteriorated. As a result, an electrode density may not be easily increased while preventing cracks of the lithium metal oxide particles.

When the lithium metal oxide particles in the shape of the secondary particle and the lithium metal oxide particles in the form of the single particle are used together, cracks of the lithium metal oxide particles in the shape of the secondary particle may be reduced in the pressing process and the electrode density may be improved. However, an electrode resistance may be increased and the electrode capacitance may become less than a theoretical electrode capacitance.

According to embodiments of the present invention, the cathode active material layer 110 may have the closed pore ratio of 5% or less, and thus may have low electrode resistance and improved electrode capacity. If the closed pore ratio exceeds 5%, the electrode resistance may be increased and the electrode capacity may become less than the theoretical electrode capacity.

In an embodiment, the closed pore ratio may be 4% or less, preferably 3.7% or less.

In an embodiment, the closed pore ratio may be 0.5% or more, or 1% or more.

In an embodiment, a specific surface area (BET) of the cathode active material layer 110 may be 1 m²/g or more, preferably from 1 m²/g to 2 m²/g, more preferably from 1 m2/g to 1.5 m²/g. Within the above range, sufficient impregnation property of the electrolyte may be achieved, and power properties of the lithium secondary battery may be improved.

In an embodiment, a density of the cathode active material layer 110 may be 3.6 g/cc or more, 3.7 g/cc or more, 3.8 g/cc or more, 3.9 g/cc or more, or 4.0 g/cc or more. Within this range, the lithium secondary battery may have a high energy density.

In an embodiment, a particle diameter ($D_{50}$) of the first lithium metal oxide particles may be in a range from 10 μm to 20 μm.

In an embodiment, a particle diameter of the second lithium metal oxide particles may be in a range from 3 μm to 10 μm from 3 μm to 7 μm or from 3 μm to 5 μm.

In an embodiment, a ratio of the particle diameter ($D_{50}$) of the second lithium metal oxide particles to the particle diameter ($D_{50}$) of the first lithium metal oxide particles may be in a range from 0.15 to 1, preferably from 0.2 to 0.5. Within the above range, the electrode density and the energy density of the lithium secondary battery may be further improved.

For example, the particle diameter ($D_{50}$) may be measured by a laser diffraction method using a laser diffraction particle size measuring device. The particle diameter $D_{50}$ may refer to a particle diameter at a point of 50% based on a volumetric particle diameter distribution obtained by the laser diffraction method.

In an embodiment, a ratio of a weight of the second lithium metal oxide particles relative to a weight of the first lithium metal oxide particles in the cathode active material layer 110 may be in a range from 1/9 to 45/55, preferably from 2/8 to 4/6. Within the above range, cracks of the first lithium metal oxide particles during the press process may be effectively prevented, and the electrode density may be further improved.

In an embodiment, each of the first lithium metal oxide particles and the second lithium metal oxide particles may contain nickel.

In some embodiments, each of the first lithium metal oxide particles and the second lithium metal oxide particles may further contain cobalt, manganese or aluminum.

In an embodiment, the first lithium metal oxide particle may contain 80 mol % or more, 83 mol % or more, 85 mol % or more, 88 mol % or more, or 90 mol % or more of Ni based on a total number of moles of all elements except lithium and oxygen.

In an embodiment, the second lithium metal oxide particle may contain 80 mol % or more, 83 mol % or more, 85 mol % or more, 88 mol % or more, or 90 mol % or more of the total number of moles of all elements except lithium and oxygen. may contain As the content of nickel in the first lithium metal oxide particle becomes higher, the capacity of the lithium secondary battery may be improved. However, during repetitive operation of the lithium secondary battery, cracks within the particles may easily occur due to a large volume change caused by insertion and desorption of lithium. Accordingly, life-span properties, high-temperature stability, etc., of the lithium secondary battery may be degraded.

The cathode according to embodiments of the present invention includes both the first lithium metal oxide particle and the second lithium metal oxide particle and haves the closed pore ratio within the above-described range, so that the generation of cracks may be prevented.

In an embodiment, the first lithium metal oxide particle may include a chemical structure or a crystal structure represented by Chemical Formula 1.

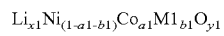  [Chemical Formula 1]

In Chemical Formula 1, M1 may include at least one of Al, Zr, Ti, Cr, B, Mg, Mn, Ba, Si, Y, W and Sr, 0.9≤x1≤1.2, 1.9≤y1≤2.1, and 0≤a1+b1≤0.2.

In some embodiments, 0<a1+b1≤0.17, 0<a1+b1≤0.15, 0<a1+b1≤0.12 or 0<a1+b1≤0.1.

In an embodiment, the second lithium metal oxide particle may include a chemical structure or a crystal structure represented by Chemical Formula 2.

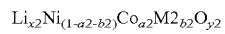  [Chemical Formula 2]

In Chemical Formula 2, M2 may include is at least one of Al, Zr, Ti, Cr, B, Mg, Mn, Ba, Si, Y, W and Sr, 0.9≤x2≤1.2, 1.9≤y2≤2.1, 0≤a2+b2≤0.2.

In some embodiments, 0≤a2+b2≤0.17, 0<a2+b2≤0.15, 0<a2+b2≤0.12 or 0<a2+b2 ≤0.1.

In some embodiments, 0≤(a2+b2)−(a1+b1)≤0.15, or 0≤(a2+b2)−(a1+b1)≤0.1. Within the above range, the capacity and life-span properties of the lithium secondary battery may be further improved.

In an embodiment, each of the first lithium metal oxide particle and the second lithium metal oxide particle may further include a coating element or a doping element. For example, the coating element or doping element may include Al, Ti, Ba, Zr, Si, B, Mg, P, Sr, W, La, an alloy thereof, or an oxide thereof.

For example, the cathode binder may be an organic binder such as polyvinylidene fluoride (PVDF), vinylidene fluoride-hexafluoropropylene copolymer (PVDF-co-HFP), polyacrylonitrile or polymethyl methacrylate; or an aqueous binder such as styrene-butadiene rubber (SBR). For example, the cathode binder may be used together with a thickener such as carboxymethyl cellulose (CMC).

For example, the conductive material may include a carbon-based conductive material such as graphite, carbon black, graphene, and carbon nanotube; a metal-based conductive material such as tin, tin oxide, titanium oxide, a perovskite material such as $LaSrCoO_3$, and $LaSrMnO_3$, etc.

Lithium Secondary Battery

Figure 2:
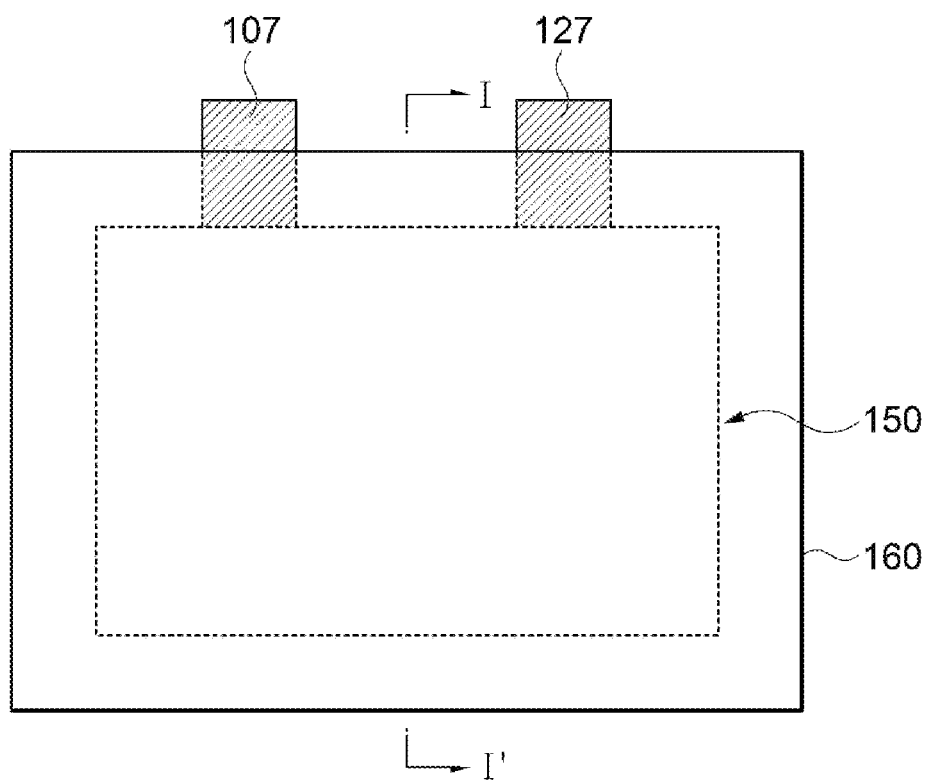
FIGS. 2 and 3 are a schematic plan view and a schematic cross-sectional view, respectively, illustrating a lithium secondary battery in accordance with exemplary embodiments.
Figure 3:
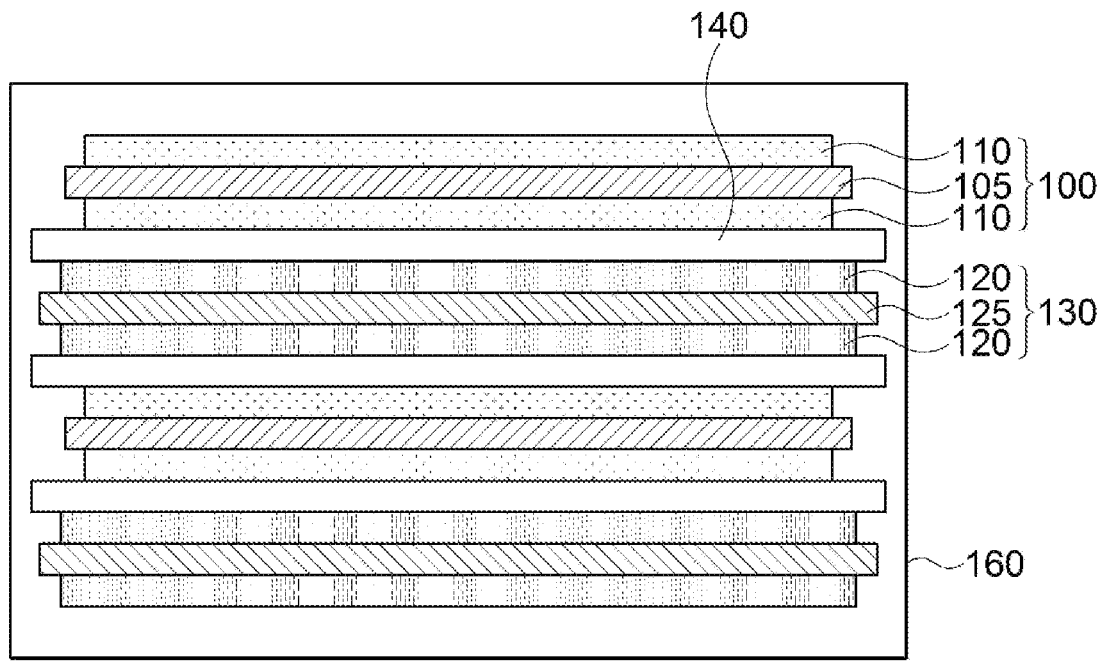

FIGS. 2 and 3 are a schematic plan view and a schematic cross-sectional view, respectively, illustrating a lithium secondary battery in accordance with exemplary embodiments. FIG. 3 is a cross-sectional view taken along a line I-I' of FIG. 2.

Referring to FIGS. 2 and 3, the lithium secondary battery may include a cathode 100 for a lithium secondary battery according to the above-described embodiments and an anode 130 facing the cathode 100.

The anode 130 may include an anode current collector 125 and an anode active material layer 120 on the anode current collector 125.

For example, the anode active material layer 120 may include an anode active material optionally with an anode binder, a conductive material, etc.

For example, the anode current collector 125 may include gold, stainless steel, nickel, aluminum, titanium, copper, or an alloy thereof.

In an embodiment, the anode active material may include a material into which lithium ions can be intercalated and de-intercalated. For example, the anode active material may include a lithium alloy, a carbon-based active material, a silicon-based active material, etc.

For example, the lithium alloy may further include aluminum, zinc, bismuth, cadmium, antimony, silicon, lead, tin, gallium, indium, etc.

For example, the carbon-based active material may include a crystalline carbon, an amorphous carbon, a carbon composite, a carbon fiber, etc.

For example, the amorphous carbon may include hard carbon, coke, a mesocarbon microbead, a mesophase pitch-based carbon fiber, etc.

For example, the crystalline carbon may include natural graphite, artificial graphite, graphitized coke, graphitized MCMB, graphitized MPCF, etc.

In an embodiment, the anode active material may include a silicon-based active material. For example, the silicon-based active material may include Si, SiOx (0<x<2), Si/C, SiO/C, a Si-Metal, etc. In this case, the lithium secondary battery having a high capacity may be implemented.

The anode binder and the anode conductive material may include materials substantially the same as or similar to those of the cathode binder and conductive material as described above.

In an embodiment, the anode binder may include an aqueous binder such as styrene-butadiene rubber (SBR). The anode binder may be used together with a thickener such as carboxymethyl cellulose (CMC).

In an embodiment, a separation 140 may be interposed between the cathode 100 and the anode 130.

In some embodiments, an area of the anode 130 may be greater than an area of the cathode 100. In this case, lithium ions generated from the cathode 100 may be easily transferred to the anode 130 without being precipitated.

For example, the separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, etc. The separation layer 140 may also include a non-woven fabric formed from a glass fiber with a high melting point, a polyethylene terephthalate fiber, etc.

For example, an electrode cell may be defined by the cathode 100, the anode 130 and the separation layer 140.

A plurality of the electrode cells may be stacked to from an electrode assembly 150. For example, the electrode assembly 150 may be formed by winding, stacking or zigzag folding (z-folding) of the separation layer 140.

The lithium secondary battery according to exemplary embodiments may include a cathode lead 107 connected to the cathode 100 to protrude to an outside of a case 160, and an anode lead 127 connected to the anode 130 to protrude to the outside of the case 160.

For example, the cathode lead 107 may be electrically connected to the cathode current collector 105. The anode lead 130 may be electrically connected to the anode current collector 125.

In an embodiment, the cathode current collector 105 may include a cathode tab (not illustrated) at one side thereof. The cathode tab may be integral with the cathode current collector 105 or may be connected to the cathode current collector 105 by, e.g., welding. The cathode active material layer 110 may not be formed on the cathode tab. The cathode current collector 105 and the cathode lead 107 may be electrically connected via the cathode tab.

In an embodiment, the anode current collector 125 may include an anode tab at one side thereof.

The anode tab may be integral with the anode current collector 125 or may be connected to the anode current collector 125 by, e.g., welding. The anode active material layer 120 may not be formed on the anode tab. The anode electrode current collector 125 and the anode lead 127 may be electrically connected via the anode tab.

The electrode assembly 150 may include a plurality of the cathodes and a plurality of the anodes. Each of the cathodes may include a cathode tab. Each of the anodes may include an anode tab.

The cathode tabs (or the anode tabs) may be laminated, compressed, and welded to form a cathode tab stack (or an anode tab stack). The cathode tab stack may be electrically connected to the cathode lead 107. The anode tab stack may be electrically connected to the anode lead 127.

For example, the electrode assembly 150 may be accommodated together with an electrolyte in the case 160 to define the lithium secondary battery.

The lithium secondary battery may be manufactured in, e.g., a cylindrical shape using a can, a square shape, a pouch shape or a coin shape.

In an embodiment, the electrolyte may include a lithium salt and an organic solvent optionally with an additive.

The lithium salt may be represented by $Li^+X^-$, and an anion of the lithium salt $X^-$ may include any one of, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2$, $CH_3CO_2^-$, $SCN^-$ and $(CF_3CF_2SO_2)_2N^-$.

In some embodiments, the lithium salt may include $LiBF_4$, $LiPF_6$, etc.

For example, the organic solvent may include a carbonate-based solvent. For example, the carbonate solvent may include ethylene carbonate (EC), propylene carbonate (PC), dimethyl carbonate (DMC), diethyl carbonate (DEC), ethyl methyl carbonate (EMC), methylpropyl carbonate, dipropyl carbonate, etc.

For example, the additive may include a fluorine-containing cyclic carbonate-based compound, a fluorine-containing lithium phosphate-based compound, a sultone-based compound, a cyclic sulfate-based compound, a borate-based compound, etc.

For example, the fluorine-containing cyclic carbonate-based compound may include fluoroethylene carbonate (FEC), etc.

For example, the fluorine-containing lithium phosphate-based compound may include lithium difluorophosphate ($LiPO_2F_2$), lithium difluoro(bisoxalato) phosphate, etc.

For example, the sultone-based compound may include 1,3-propane sultone (PS), 1,4-butane sultone, ethensultone, 1,3-propene sultone (PRS), 1,4-butene sultone, 1-methyl-1,3-propene sultone, etc.

For example, the cyclic sulfate-based compound may include ethylene sulfate (ESA), trimethylene sulfate (TMS), methyltrimethylene sulfate (MTMS), etc.

For example, the borate-based compound may include lithium tetraphenylborate, lithium difluoro(oxalato)borate (LiODFB), etc.

For example, the nitrile-based compound may include succinonitrile, adiponitrile, acetonitrile, propionitrile, butyronitrile, cyclopentane carbonitrile, cyclohexane carbonitrile, 2-fluorobenzonitrile, 4-fluorobenzo nitrile, difluorobenzonitrile, trifluorobenzonitrile, phenylacetonitrile, 2-fluorophenylacetonitrile, 4-fluorophenylacetonitrile, etc.

Figure 4:
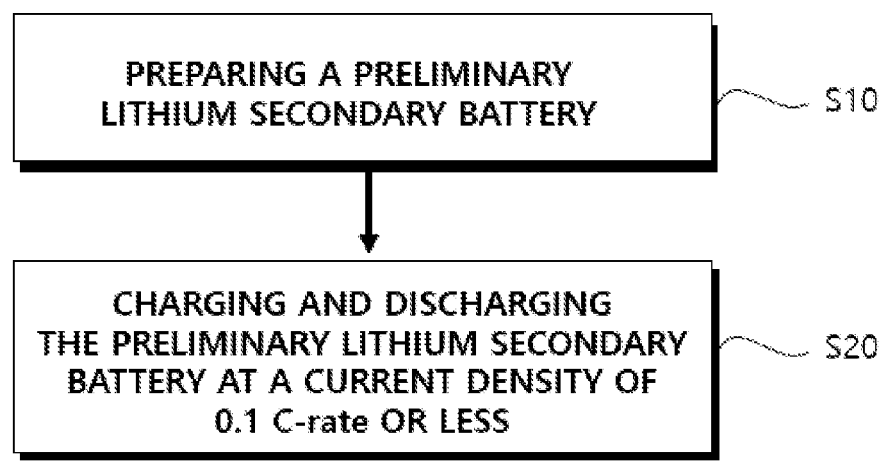
FIG. 4 is a flow diagram for describing a method of fabricating a lithium secondary battery in accordance with exemplary embodiments.

FIG. 4 is a flow diagram for describing a method of fabricating a lithium secondary battery in accordance with exemplary embodiments.

Specifically, FIG. 4 illustrates a process for preparing cathode active material particles including first lithium metal oxide particles having the form of a secondary particle in which a plurality of primary particles are aggregated and second lithium metal oxide particles having the form of a single particle may be prepared. A preliminary lithium secondary battery that includes a cathode (hereinafter, referred to as a preliminary cathode) including a cathode active material layer formed using the cathode active material particles, and an anode may be prepared (e.g., in a phase of S10).

For example, the preliminary cathode may refer to a cathode including a cathode active material layer having a closed pore ratio defined by Equation 1 above greater than 5%.

For example, a cathode slurry may be prepared by dispersing the first lithium metal oxide particles, the second lithium metal oxide particles in a dispersion medium optionally with a cathode binder and a conductive material. The slurry may be coated on a cathode current collector, and then dried and pressed to form the preliminary cathode.

For example, an anode slurry may be prepared by dispersing the anode active material in a dispersion medium optionally with an anode binder and a conductive material. The anode slurry may be coated on an anode current collector, and then dried and pressed to form the anode.

The preliminary lithium secondary battery may be manufactured using the preliminary cathode and the anode according to a method widely known in the related art.

The preliminary lithium secondary battery may be charged and discharged at a current density equal to or less than 0.1 C-rate (Current Rate) (e.g., in a phase of S20).

The C-rate refers to a value obtained by dividing a charging current (or a discharging current) by a rated capacity of the battery. For example, charging (or discharging) at a 1 C-rate may mean charging (or discharging) at a current equal to the rated capacity of the battery.

In an embodiment, the preliminary lithium secondary battery may be charged and discharged at a current density of 0.1 C-rate or less between SOC 0% and SOC 100%.

In an embodiment, the preliminary secondary lithium battery may be charged and discharged at a current density of 0.1 C-rate or less between SOC 20% and SOC 80%.

In an embodiment, the preliminary secondary lithium battery may be charged at a current density of 0.1 C-rate or less from SOC 0% to 20% to SOC 80% to 100%.

In an embodiment, the preliminary lithium secondary battery may be discharged only at a current density of 0.1 C-rate or less from SOC 80% to 100% to SOC 0% to 20%.

The closed pore ratio may be adjusted to 5% or less by charging and discharging the preliminary lithium secondary battery as described above. Accordingly, a cathode for a lithium secondary battery according to exemplary embodiments of the present invention may be provided.

For example, when the preliminary lithium secondary battery is charged and discharged at a current density exceeding 0.1 C-rate, the closed pore ratio may exceed 5%.

In an embodiment, a unit cycle of the above-described charging and discharging the preliminary lithium secondary battery once at a current density of 0.1 C-rate or less may be performed at least three times.

In an embodiment, the above-described charging and discharging of the preliminary lithium secondary battery may be included in a formation process or may be performed after the formation process.

Example 1

(1) Preparation of Preliminary Lithium Secondary Battery

First lithium metal oxide particles ($LiNi_{0.88}Co_{0.09}Mn_{0.03}O_2$ and $D_{50}=13$ µm) having a form of a secondary particle in which a plurality of primary particles were aggregated; and second lithium metal oxide particles ($LiNi_{0.88}Co_{0.09}Mn_{0.03}O2$, $D_{50}=3.5$ µm) having a form of a single particle.

The cathode active material in which the first lithium metal oxide particles and the second lithium metal oxide particles were mixed in a weight ratio of 7:3, carbon black and polyvinylidene fluoride were dispersed in a weight ratio of 92:5:3 in N-methyl-2-pyrrolidone (NMP) to prepare a cathode slurry.

The cathode slurry was coated on an area except for a protrusion of an aluminum foil (15 µm-thickness) having the protrusion (a cathode tab) at one side, and dried and pressed to prepare form a cathode. An electrode density of the cathode was adjusted to 3.7 g/cc.

An anode slurry was prepared by dispersing an anode active material in which artificial graphite and natural graphite were mixed in a weight ratio of 7:3, styrene-butadiene rubber (SBR) and carboxymethyl cellulose (CMC) in a weight ratio of 97:1:2 in distilled water The anode slurry was coated on an area except for a protrusion of a copper foil (15 µm-thickness) having the protrusion (an anode tab) on one side, and dried and presses to form an anode.

An electrode assembly was formed by interposing a polyethylene separator (thickness of 20 µm) between the cathode and the anode. A cathode lead and an anode lead were connected to the cathode tab and the anode tab by welding, respectively.

A 1M $LiPF_6$ solution (30:70 v/v EC/EMC mixed solvent) was prepared, 1 wt % of FEC (fluoroethylene carbonate), 0.3 wt % of VC (vinylethylene carbonate), 1 wt % of $LiPO_2F_2$ (lithium difluorophosphate), 0.5 wt % of PS (1,3-propane sultone) and 0.5 wt % of PRS (prop-1-ene-1,3-sultone) were added based on a total 100 wt % of an electrolyte solution to prepare the electrolyte solution.

The electrode assembly was accommodated in a pouch (a case) so that partial regions of the cathode lead and the anode lead were exposed to an outside, and three sides except for an electrolyte injection side were sealed. The electrolyte solution was injected into the pouch and the electrolyte injection side was sealed to prepare a preliminary secondary battery.

(2) Fabrication of Lithium Secondary Battery (Formation; Low C-rate Charge/Discharge)

The preliminary lithium secondary battery was charged (0.1 C-rate, 4.2 V CUT-OFF) and discharged (0.1 C-rate, 3.0V CUT-OFF) at 25° C.

Three cycles of the charging and discharging were repeated to manufacture a lithium secondary battery.

Examples 2 to 6

Lithium secondary batteries were fabricated by the same method as that in Example 1, except that mixing weight ratios of the first lithium metal oxide particles and the second lithium metal oxide particles were changed according to Table 1 below.

Comparative Example 1

A lithium secondary battery was fabricated by the same method as that in Example 1, except that the preliminary lithium secondary battery was charged and discharged at 0.25 C-rate during the formation.

Comparative Examples 2 to 6

Lithium secondary batteries were fabricated by the same method as that in Comparative Example 1, except that mixing weight ratios of the first lithium metal oxide particles and the second lithium metal oxide particles were changed according to Table 1 below.

Experimental Example (1) Analysis of Closed Pore Ratio in Cathode Active Material Layer The cathodes were separated from the lithium secondary batteries of Examples and Comparative Examples. Closed pore ratios of the cathode active material layers were calculated as follows:
1) A 2D transmission image of the cathode active material layer was obtained using an XRM (X-Ray Microscope) equipment. Versa 520 (Zeiss) or Versa 620 (Zeiss) was used as the XRM equipment. The 2D transmission image was obtained at a voxel size of 300 nm to 700 nm, an accelerating voltage of 40 kV to 100 kV, and an output of 2 W to 14 W.
2) A solid region (shaded portion) and a pore region were distinguished from the 2D transmission image, and a 3D structure image was derived by a 3D rendering. The 3D structure was set so that the volume of total pores of the 3D structure has the same value as the volume of total pores of the cathode active material layer measured by the mercury intrusion porosimetry.
3) The 3D structure image was analyzed using a 3D structure analysis program to calculate a total volume (V1) of closed pores and a total volume of open pores (V2). Geodict S/W or Dragonfly (Zeiss) was used as the 3D rendering program and the 3D structural analysis program.
4) The closed pore ratio (%) was calculated based on a following equation.

Closed pore ratio (%)={$V1/(V1+V2)$}×100

2) Evaluation on Specific Surface Area of Cathode Active Material Layer

A specific surface areas (BET) of each cathode active material layers of the separated cathodes was measured based on a gas adsorption/desorption method using a BET measuring instrument (Micrometrics, ASAP 2420).

(3) Evaluation on Capacity Evaluation of Lithium Secondary Battery

The lithium secondary batteries of Examples and Comparative Examples were CC/CV charged (0.3C 4.2V, 0.05C CUT-OFF) and CC discharged (0.3C 2.7V CUT-OFF) at 25 ° C., and then discharge capacities were measured.

TABLE 1

| No. | secondary particle:single particle mixing weight ratio | low C-rate charge/ discharge | closed pore ratio (%) | BET ($m_2/g$) | discharge capacity (mAh/g) |
|---|---|---|---|---|---|
| Example 1 | 80:20 | o | 3.55 | 1.21 | 201.0 |
| Example 2 | 70:30 | o | 3.68 | 1.21 | 201.5 |
| Example 3 | 60:40 | o | 3.73 | 1.23 | 200.7 |
| Example 4 | 40:60 | o | 3.71 | 1.22 | 201.1 |
| Example 5 | 30:70 | o | 3.62 | 1.26 | 200.4 |
| Example 6 | 20:80 | o | 3.53 | 1.29 | 201.4 |
| Comparative Example 1 | 80:20 | x | 5.09 | 0.92 | 198.2 |
| Comparative Example 2 | 70:30 | x | 5.02 | 0.96 | 198.3 |
| Comparative Example 3 | 60:40 | x | 5.25 | 0.98 | 198.2 |
| Comparative Example 4 | 40:60 | x | 5.31 | 0.91 | 197.6 |
| Comparative Example 5 | 30:70 | x | 5.44 | 0.87 | 197.8 |
| Comparative Example 6 | 20:80 | x | 5.43 | 0.83 | 198.0 |

Referring to Table 1, the lithium secondary batteries of Examples exhibited improved capacity than the lithium secondary batteries of Comparative Examples.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only a few examples of embodiments of the disclosed technology are provided. Variations, modifications and enhancements of the disclosed embodiments and other embodiments may be made based on what is disclosed and illustrated in this patent document.

What is claimed is:

1. A cathode for a lithium secondary battery, comprising:
a cathode current collector; and
a cathode active material layer on the cathode current collector, the cathode active material layer comprising cathode active material particles,
wherein the cathode active material particles comprise first lithium metal oxide particles having a shape of a secondary particle in which a plurality of primary particles are aggregated, and second lithium metal oxide particles having a shape of a single particle, and
a closed pore ratio of the cathode active material layer defined by Equation 1 is 5% or less:

Closed pore ratio (%)={$V1/(V1+V2)$}×100  [Equation 1]

wherein, in Equation 1, V1 is a total volume of closed pores within an inside of the cathode active material layer and pores at an inside of the cathode active material particles are excluded from the closed pores, and V2 is a total volume of open pores of the cathode active material layer,
wherein the closed pores are pores that are not connected to an outside of the cathode active material layer, and the open pores are pores connected to the outside of the cathode active material layer.

2. The cathode for a lithium secondary battery according to claim 1, wherein the closed pore ratio is 3.7% or less.

3. The cathode for a lithium secondary battery according to claim 1, wherein a specific surface area of the cathode active material layer is in a range from 1 m²/g to 1.5 m²/g.

4. The cathode for a lithium secondary battery according to claim 1, wherein the cathode active material layer has a density of 3.6 g/cc or more.

5. The cathode for a lithium secondary battery according to claim 1, wherein a particle diameter ($D_{50}$) of the first lithium metal oxide particles is in a range from 10 μm to 20 μm.

6. The cathode for a lithium secondary battery according to claim 1, wherein a particle diameter ($D_{50}$) of the second lithium metal oxide particle is in a range from 3 μm to 10 μm.

7. The cathode for a lithium secondary battery according to claim 1, wherein a ratio of a particle diameter ($D_{50}$) of the second lithium metal oxide particles relative to a particle diameter ($D_{50}$) of the first lithium metal oxide particles is in a range from 0.2 to 0.5.

8. The cathode for a lithium secondary battery according to claim 1, wherein a weight ratio of the second lithium metal oxide particles relative to the first lithium metal oxide particles in the cathode active material layer is in a range from 1/9 to 45/55.

9. The cathode for a lithium secondary battery according to claim 1, wherein each of the first lithium metal oxide particles and the second lithium metal oxide particles contains nickel.

10. The cathode for a lithium secondary battery according to claim 9, wherein each of the first lithium metal oxide particles and the second lithium metal particles contains 80 mol % or more of nickel based on a total number of moles of all elements excluding lithium and oxygen.

11. A lithium secondary battery, comprising:
a cathode for a lithium secondary battery according to claim 1; and
an anode facing the cathode.

* * * * *